(12) United States Patent
Karabelas et al.

(10) Patent No.: US 8,689,423 B2
(45) Date of Patent: Apr. 8, 2014

(54) REDUCING FLUID TURBULANCE IN A FLEXIBLE PIPE

(75) Inventors: George Karabelas, Newcastle-Upon-Tyne (GB); Laurence James Baldwin, Newcastle-Upon-Tyne (GB)

(73) Assignee: Wellstream International Limited, Newcastle-upon-Tyne (GB)

( * ) Notice: Subject to any disclaimer, the term of this patent is extended or adjusted under 35 U.S.C. 154(b) by 185 days.

(21) Appl. No.: 13/131,010

(22) PCT Filed: Nov. 17, 2009

(86) PCT No.: PCT/GB2009/051551
§ 371 (c)(1),
(2), (4) Date: May 24, 2011

(87) PCT Pub. No.: WO2010/064026
PCT Pub. Date: Jun. 10, 2010

(65) Prior Publication Data
US 2011/0247698 A1  Oct. 13, 2011

(30) Foreign Application Priority Data
Dec. 2, 2008 (GB) .................................. 0821989.1

(51) Int. Cl.
*B21D 39/00* (2006.01)

(52) U.S. Cl.
USPC .......................................................... 29/523

(58) Field of Classification Search
USPC ....... 137/13, 561 R; 29/523, 522.1, 434, 435, 29/436, 402.01, 402.04, 402.08
See application file for complete search history.

(56) References Cited

U.S. PATENT DOCUMENTS

| 6,250,385 B1 | 6/2001 | Montaron |
| 7,188,678 B2 * | 3/2007 | Richard et al. ................ 166/384 |
| 2003/0024629 A1 | 2/2003 | Wright et al. |
| 2006/0151656 A1 | 7/2006 | Gallagher et al. |

OTHER PUBLICATIONS

International Preliminary Report on Patentability and Written Opinion of the International Searching Authority, mailed Jun. 16, 2011, for corresponding International Application No. PCT/GB2009/051551, 8 pages.
International Search Report and Written Opinion of the International Searching Authority, mailed Mar. 3, 2010, for corresponding International Application No. PCT/GB2009/051551, 14 pages.
Third Party Observations filed with European Patent Office in European Patent Application No. 09756553.5—1605 on Dec. 12, 2013 (3 pages).
Crome et al., "Smoothbore Flexible Riser for Gas Export," Offshore Technology Conference, Apr. 30, 2007 (10 pages).

\* cited by examiner

*Primary Examiner* — John C Hong
(74) *Attorney, Agent, or Firm* — Klarquist Sparkman, LLP

(57) ABSTRACT

A method and apparatus for reducing fluid turbulence in a flexible pipe are disclosed. The method includes the steps of urging an elongate roll of liner material along a bore region provided by an inner surface of an innermost layer of a flexible pipe body, and at least partially unfurling the roll of liner material thereby extending the roll of liner material radially outwardly in the bore region into an abutting relationship against the inner surface of the carcass.

21 Claims, 5 Drawing Sheets

REDUCING FLUID TURBULANCE IN A FLEXIBLE PIPE

CROSS REFERENCE TO RELATED APPLICATIONS

Figure 1:
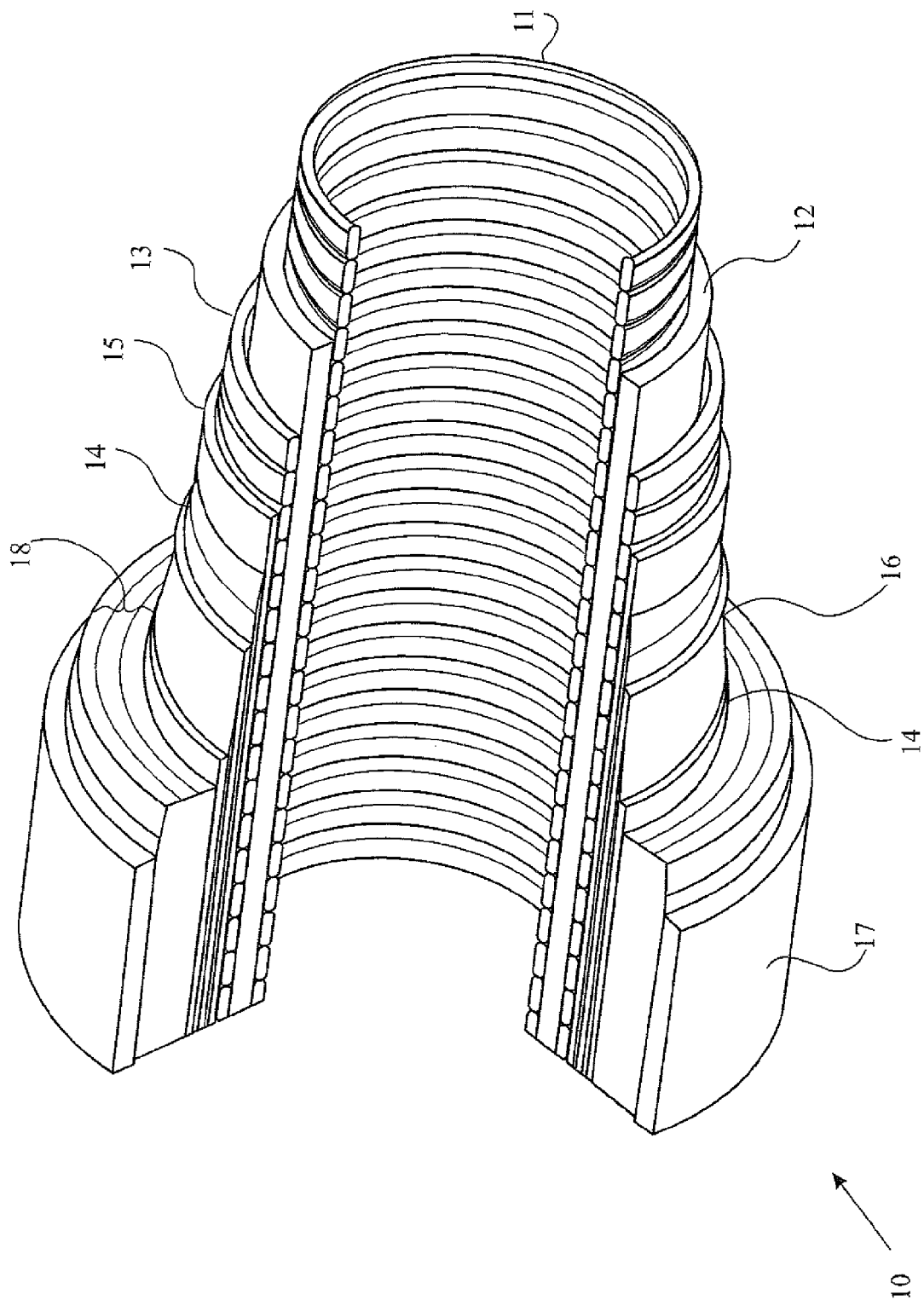

This is the U.S. National Stage of International Application No. PCT/GB2009/051551, filed Nov. 17, 2009, which in turn claims the benefit of United Kingdom Application No. GB0821989.1, filed Dec. 2, 2008.

The present invention relates to flexible pipes which may be used to transport fluids such as production fluids, exportation fluids or injection fluids from one location to another. In particular, but not exclusively, the present invention relates to a method and apparatus for reducing fluid turbulence in fluids transported in a rough bore flexible pipe.

Traditionally flexible pipe is utilised to transport production fluids, exportation fluids or injection fluids such as oil and/or gas and/or water from one location to another. Flexible pipe is particularly useful in connecting a sub-sea location to a further sub-sea location or a sea level location. Flexible pipe is generally formed as a length of flexible pipe body and one or more end fittings at the ends of the pipe body. The pipe body is typically formed as a composite structure of tubular layers of material that form a fluid and pressure containing conduit. The pipe structure is flexible and allows relatively large deflections without causing bending stresses that impair the pipe's functionality over a desired lifetime. The pipe body is generally, but not necessarily, built up as a composite structure including metallic and polymer layers. Flexible pipe may be utilised as a flow line over land and/or at a sub-sea location. Flexible pipe may also be used as a jumper or riser.

Rough bore and smooth bore flexible pipes are known. Smooth bore flexible pipe includes a fluid retaining layer called a liner. A smooth inner surface of the liner defines a bore along which fluid is transported. However, on occasion when a bore is depressurised an accumulated pressure in an annulus region of the flexible pipe radially outside the liner can cause the liner to collapse and this leads to irreversible damage. A solution is to provide a carcass inside the fluid retaining layer. This is a so-called rough bore application and the carcass, which is formed by helically winding shaped strips in an interlocked fashion, prevents collapse of the fluid retaining layer under depressurisation of the bore by supporting the fluid retaining layer. When a carcass is used the fluid retaining layer is termed a barrier layer.

A problem which is experienced with rough bore applications is that the interlocked shaped strip of a carcass layer have a detrimental effect upon the flow of fluid along the flexible pipe. Effectively the irregular inner surface of the carcass leads to the formation of vortices in the fluid flow which can give rise to pressure variations. These pressure variations can cause problems particularly when resonance occurs. These pressure fluctuations and vibrations which are generated can cause damage and ultimately failure to ancillary equipment connected to a flexible pipe. The term vortex induced vibration (VIV) has been coined in the art to describe the phenomenon which results in such problems.

It is an aim of the present invention to at least partly mitigate the above-mentioned problems.

It is an aim of certain embodiments of the present invention to improve the flow characteristics of rough bore flexible pipes or other flexible pipes in which an inner bore is irregular or undulating along its whole length or part of the whole length.

It is an aim of certain embodiments of the present invention to eliminate wholly or in part problems associated with vortex induced vibration.

It is an aim of certain embodiments of the present invention to provide an apparatus and methodology which enables a solution to vortex induced vibration to be retrofitted to existing rough bore flexible pipes or to be incorporated at an initial flexible pipe manufacturing stage.

According to a first aspect of the present invention there is provided a method of reducing fluid turbulence in a flexible pipe, the method comprising the steps of:
  urging an elongate roll of liner material along a bore region provided by an inner surface of an innermost layer of a flexible pipe body; and
  at least partially unfurling the roll of liner material thereby extending the roll of liner material radially outwardly in the bore region into an abutting relationship against the inner surface of the carcass.

According to a second aspect of the present invention there is provided apparatus for reducing fluid turbulence in a flexible pipe comprising an innermost layer having a rough inner surface, comprising:
  an elongate roll of liner material having an outer diameter less than an inner diameter of the innermost layer of a flexible pipe body.

Certain embodiments of the present invention provide a method of reducing fluid turbulence in a rough bore flexible pipe which enables a roll of liner material to be introduced within a carcass layer and opened out thus effectively smoothing out the internal bore of the flexible pipe. A longitudinal or helical slit formed along the length of the liner provides the dual advantage of enabling the liner to be incorporated or retrofitted within the carcass in a convenient manner as well as providing a fluid communication path through the thickness of the liner so as to avoid collapse of the liner when the internal bore of a flexible pipe is depressurised.

Certain embodiments of the present invention provide a liner which is retrofittable, removable and/or replaceable so that it can be retrofitted to almost any rough bore flexible pipe used for any purpose (such as, for example, risers, jumpers or flow lines) in situ without the need to first recover the flexible pipe.

Certain embodiments of the present invention make use of a rolled liner which can itself be used to support monitoring or other ancillary equipment such as fibre optics, normal wires and/or sensors so that these can be simultaneously located in an operating position when the liner is put in place.

Figure 2:
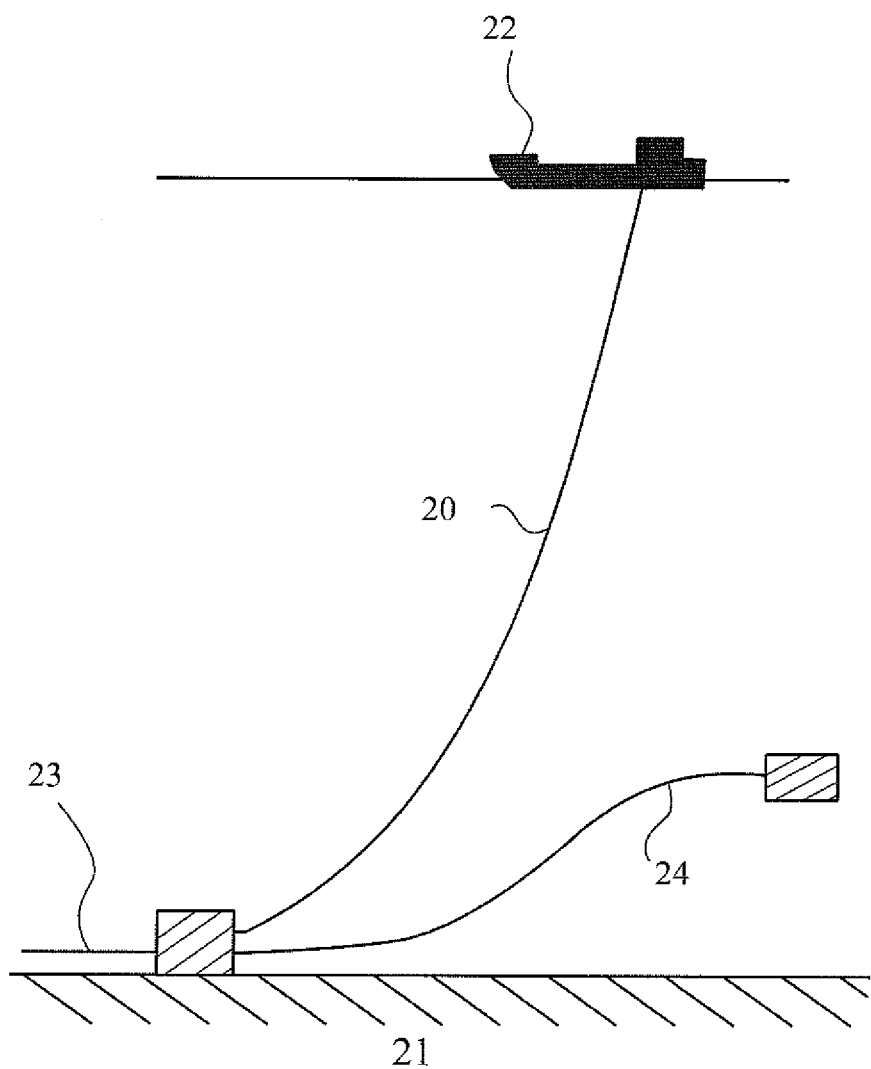
Figure 3:
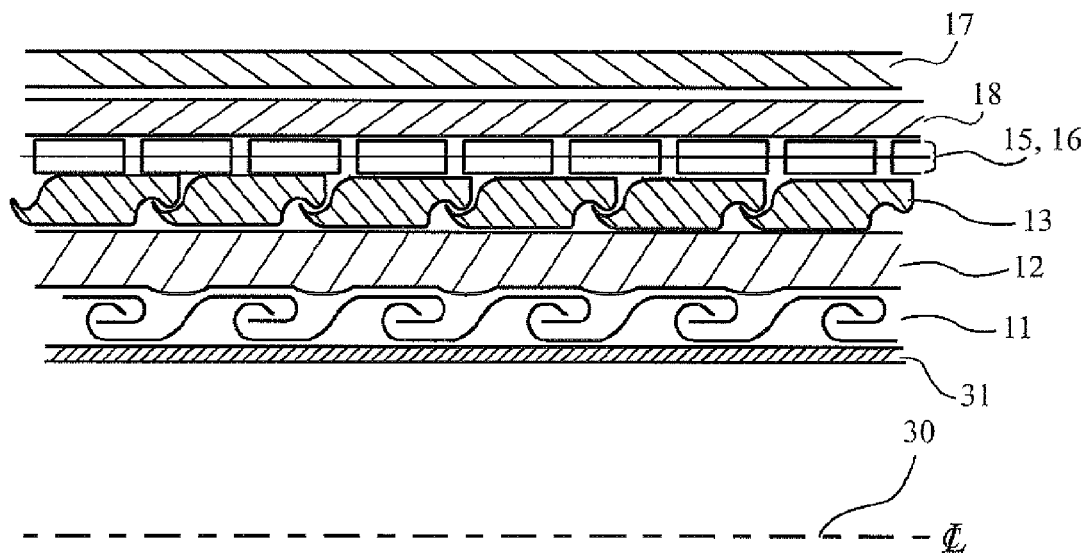
Figure 6:
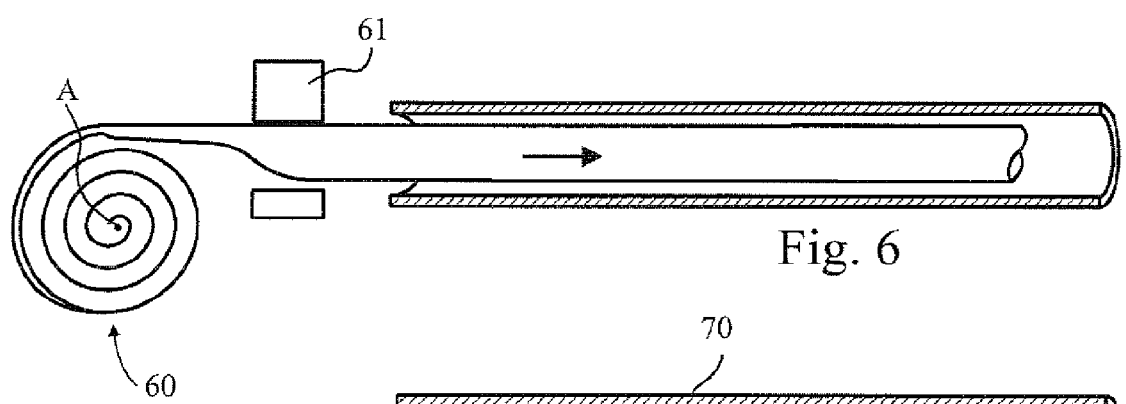
Figure 7:
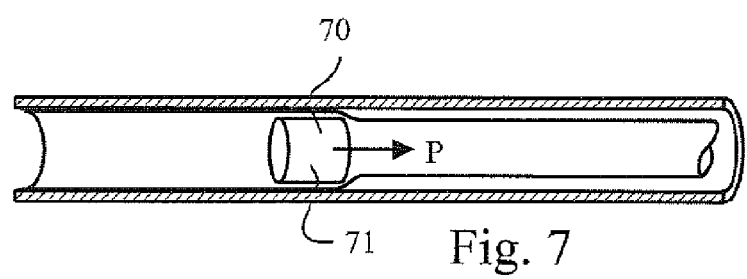
Figure 4A:
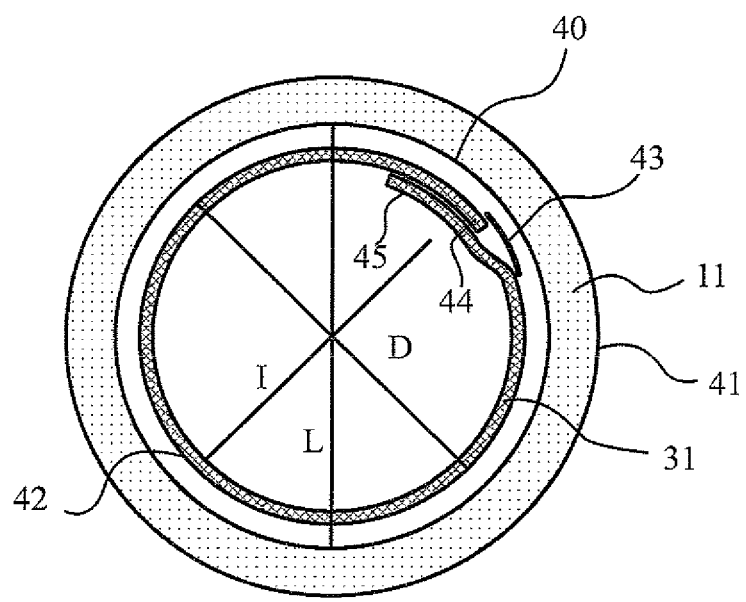
Figure 4B:
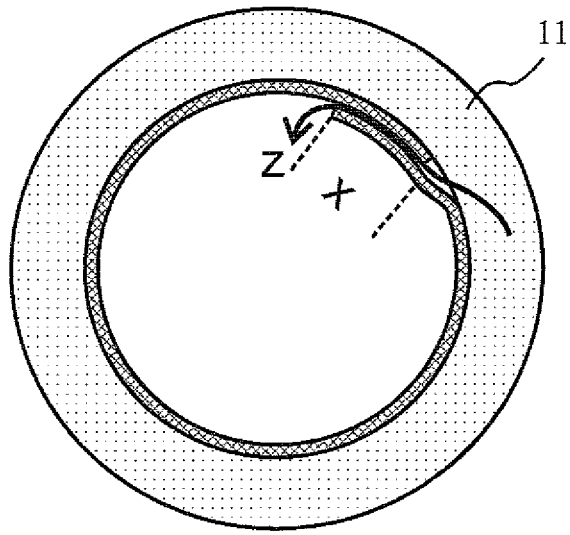
Figure 5A:
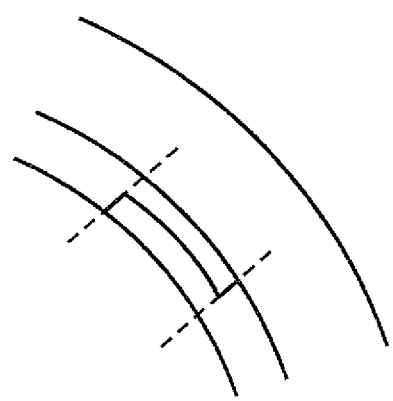
Figure 5B:
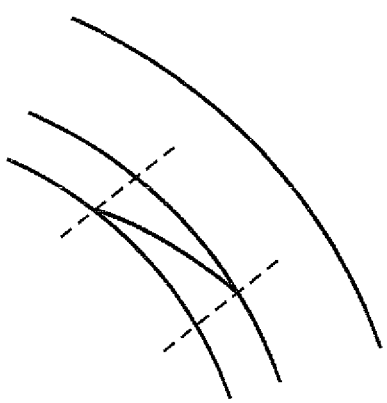
Figure 5C:
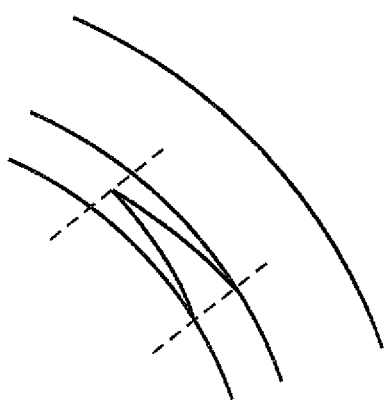

Embodiments of the present invention will now be described hereinafter, by way of example only, with reference to the accompanying drawings in which:
  FIG. 1 illustrates flexible pipe body;
  FIG. 2 illustrates a jumper, flowline and riser;
  FIG. 3 illustrates a liner located under a carcass layer;
  FIG. 4a illustrates a furled roll of liner material;
  FIG. 4b illustrates an unfurled roll of liner material;
  FIGS. 5a, 5b, 5c illustrate edge profiling;
  FIG. 6 illustrates unrolling a roll of bistable material; and
  FIG. 7 illustrates motion of a pig.

In the drawings like reference numerals refer to like parts.

Throughout this specification reference will be made to a flexible pipe. It will be understood that a flexible pipe is an assembly of a portion of pipe body and one or more end fittings in each of which an end of the pipe body is terminated. FIG. 1 illustrates how a pipe body 10 is formed in accordance with an embodiment of the present invention from a composite of layered materials that form a pressure-containing conduit. Although a number of particular layers are illustrated in FIG. 1, it is to be understood that the present invention is broadly applicable to composite pipe body structures including two or more layers. It is to be further noted that the layer thicknesses are shown for illustrative purposes only.

As illustrated in FIG. 1, pipe body includes an inner carcass layer 11. The carcass provides an interlocked metallic construction that can be used as an inner layer to prevent, totally or partially, collapse of an internal pressure sheath 12 due to pipe decompression, external pressure, tensile armour pressure and mechanical crushing loads. It will be appreciated that embodiments of the present invention are applicable to such "rough bore" applications or other applications where a "rough" inner surface is presented to transported fluid.

The internal pressure sheath 12 acts as a fluid retaining layer and typically comprises a polymer layer that ensures internal-fluid integrity. It is to be understood that this layer may itself comprise a number of sub-layers. It will be appreciated that when the carcass layer is utilised the internal pressure sheath is often referred to in the art as a barrier layer.

A pressure armour layer 13 is formed over the internal pressure sheath and is a structural layer with a lay angle close to 90° that increases the resistance of the flexible pipe to internal and external pressure and mechanical crushing loads. The layer also structurally supports the internal-pressure sheath and typically consists of an interlocked metallic construction.

The flexible pipe body may also include one or more layers of tape 14 and a first tensile armour layer 15 and second tensile armour layer 16. Each tensile armour layer is a structural layer with a lay angle typically between 20° and 55°. Each layer is used to sustain tensile loads and internal pressure. The tensile armour layers are counter-wound in pairs.

The flexible pipe body also includes an outer sheath 17 which comprises a polymer layer used to protect the pipe against penetration of seawater and other external environments, corrosion, abrasion and mechanical damage. One or more layers 18 of insulation may also be included.

Each flexible pipe comprises at least one portion, sometimes referred to as a segment or section of pipe body 10 together with an end fitting located at at least one end of the flexible pipe. Usually an end fitting is used at both ends of the segment of flexible pipe body. An end fitting provides a mechanical device which forms the transition between the flexible pipe body and a connector. The different pipe layers as shown, for example, in FIG. 1 are terminated in the end fitting in such a way as to transfer the load between the flexible pipe and the connector. Segments of flexible pipe may be joined together in an end-to-end arrangement to make long lengths of flexible pipe. The adjacent segments may include segments of identical flexible pipe body or segments in which the flexible pipe body has different layers and/or physical properties.

FIG. 2 illustrates a riser assembly 20 suitable for transporting production, exportation or injection fluid such as oil and/or gas and/or water from a sub-sea location 21 to a floating facility 22. For example, in FIG. 2 the sub-sea location 21 is a connection to a sub-sea flow line 23. The flexible flow line comprises a flexible pipe, wholly or in part, resting on the sea floor or buried below the sea floor. The floating facility may for example be provided by a platform and/or buoy or, as illustrated in FIG. 2, a ship. The riser 20 is provided as a flexible riser, that is to say a flexible pipe connecting the ship to the sea floor installation. Alternatively the flexible pipe can be used as a jumper 24.

FIG. 3 illustrates a cross section through the flexible pipe body illustrated in FIG. 1 but omitting tape layers for the sake of brevity and including a duly located layer of liner material.

As illustrated in FIG. 3 the flexible pipe body 10 is associated with a central longitudinal axis 30 corresponding to the centre of an internal bore of the flexible pipe body. Production, exportation or injection fluid or the like is transported along this bore in use. The flexible pipe body illustrated in FIG. 3 includes an inner layer of liner material 31 which is located in an abutting relationship with an inner surface of the interlocked windings forming the carcass 11. Radially outside the carcass 11 is a barrier layer 12 which acts as the fluid retaining layer for the flexible pipe body and thus defines the bore along which fluid is transported. A pressure armour layer 13 is formed radially outside the barrier layer 12 to provide support thereto. Tensile armour 15, 16, insulation 18 and an outer sheath 17 are also shown. The outer sheath is the most radially outward layer of the flexible pipe body.

FIGS. 4a, 4b illustrate how the roll of liner material can be introduced along the "rough" inner surface of the carcass layer in a rolled manner. As illustrated in FIG. 4a an inner surface 40 of the carcass is defined by the radially innermost surfaces of the interlocked windings of the carcass. A radially outermost surface 41 of the carcass is defined by a radially outermost surfaces of each of the windings of the carcass. (Other layers radially outside the carcass are not illustrated in FIG. 4a or 4b for the sake of brevity).

An elongate roll of liner material 31 is rolled up so that a diameter D of an outer surface 42 of the roll of liner material is less than a diameter L associated with the inner surface 40 of the carcass. It will be appreciated that while the elongate roll of liner material is being located along the bore of the flexible pipe body the roll is prevented from unfurling by a securement. This securement in FIG. 4a is illustrated by a length of adhesive tape 43 securing an outermost edge 44 of the roll of liner with respect to an underlying part 45 of the roll of liner material. It will be understood that a variety of securement methods can be utilised according to certain embodiments of the present invention. Aptly a series of welds is formed along the length of the roll of liner material. Aptly a single elongate weld extending along the length of the liner material is used. Aptly a single length of tape extending along the liner material is used. Aptly multiple tape strips adhered at various positions along the length of liner material are used. The roll of liner material is thus temporarily held together in a configuration of a rolled up cylinder. This rolled cylinder is inserted into the bore of the flexible pipe and pulled or pushed along the inner bore (as will be described hereinbelow) until the roll of liner material extends a predetermined length along the bore. This may be the whole length or only a part of the whole length of the flexible pipe body.

Once duly located the securement securing the roll of liner material in its furled state is released. The roll of liner material is then caused to unfurl into a position illustrated in FIG. 4b in which the outer surface 42 of the liner material is brought into an abutting relationship with the inner surface 40 of the carcass layer. It will be appreciated that as illustrated in FIG. 4b the length x in which the liner material overlaps itself is reduced as the roll of liner material unfurls from its secured state shown in FIG. 4a to the unsecured state shown in FIG. 4b.

FIGS. 5a, 5b and 5c illustrate alternative embodiments of the present invention in which the elongate edges of the roll of liner material which extend along the length of the roll of liner material can be profiled so that in the relaxed/unfurled state when an outer surface of the liner material abuts with an inner surface of the carcass these edge regions nest into a mating relationship. For example, as illustrated in FIG. 5a the edge regions are stepped whilst in FIG. 5b the edge regions are tapered whilst in FIG. 5c the edge regions are V-cut. An advantage of utilising such a profiled shape is that when unfurled the inner surface of the roll of liner material presents a substantially smooth inner bore to the fluids being transported.

Utilising a slit roll of liner material to form a liner layer over a rough (irregular, scratched or undulating) surface (such as, but not limited to, the inner surface provided by a carcass of a rough bore flexible pipe) provides two advantages. Firstly the elongate roll of material can be easily introduced along the bore of the flexible pipe body and then unfurled. Secondly, the overlying or abutting ends of the roll of liner material which are not sealed provide a fluid communication path z between the inner bore region of the flexible pipe body and an annulus region between the outer surface 42 of the liner material and an inner surface of the barrier layer 12. Without such a pathway any gases trapped between the inner liner and the barrier layer 12 could cause the collapse of the innermost liner if the bore region were depressurised.

The roll of liner material once duly located and unfurled provides an anti-turbulence sheath internally covering the rough undulating surface of the flexible pipe. The layer of liner material can be manufactured in a number of different techniques such as, for example, being manufactured as a sheet subsequently rolled up or being an extruded cylindrical liner subsequently slit along its full length either in a linear or helical fashion. Fluid communication paths such as through holes through the liner are not required because a fluid communication path is automatically generated where the rolled edges of the liner material overlap or abut in a non sealed configuration.

It will be appreciated that the roll of liner material is removable and replaceable and as such can be retrofitted to almost any flexible pipe for example when used as a riser, flow line or jumper or the like without the need to first recover the flexible pipe.

FIG. 6 and FIG. 7 illustrate how the undulating surface of a flexible pipe may be smoothed with a roll of liner material according to certain embodiments of the present invention. As illustrated in FIG. 6 a roll of "bi-stable" composite material is provided at a target location. For example where a flexible pipe is being manufactured. This can occur at a point in time when only an initial inner surface of the flexible pipe has been formed or may be at a subsequent stage during manufacture of the flexible pipe body. Alternatively the target location is the location of the flexible pipe during a retrofit operation when the flexible pipe is in situ but has been shutdown for a period of time. The roll 60 of bi-stable material has an axis A aligned going into/coming out of the page. As the roll 60 of bi-stable composite material is unrolled the unrolled material naturally adopts a further shape. Such materials which can be spooled and rolled in one natural direction and then unrolled so as to adopt a further natural shape are well known, for example, polyethylene and glass fibre or polyethylene and nylon resin materials which may or may not be reinforced with, for example glass fibres or carbon fibres. Such materials are well documented for example in EP-B-0891248 and EP-B-1091902 which are incorporated herein by way of reference. As the spooled material is unrolled a slitting and furling station 61 slits the material and allows it to roll into a furled roll having a longitudinal axis corresponding with the longitudinal axis of the flexible pipe. The slitting and rolling station 61 may also secure the furled roll of liner material in a furled manner. For example, the station may include a tape application stage or welding apparatus. It will be appreciated that the slitting, rolling and securing stages may optionally take place at different locations prior to the urging of the roll of liner along the inner bore of the flexible pipe body. The spooled material may already be "slit" so that a slitting function is not required.

The roll of liner material can be directed along the bore of the flexible pipe body by any one of a number of optional techniques. For example, as shown in FIG. 6 the material of the bi-stable composite is such that there is sufficient rigidity in the material so that as the material is pushed along the inner bore of the flexible pipe body from the left hand side of FIG. 6 the leading end of the roll of liner material advances. Alternatively a cord or cords can be secured to the leading edge and the roll of liner material and pulled through the length of flexible pipe body from an exit end. The cord used to pull the roll of liner material from an entry end through the flexible pipe may itself be duly located by blowing a pipeline pig through the flexible pipe body in a first direction with the cord secured to the pig. The cord is then pulled with the roll of liner material through the flexible pipe body in the same or an opposite direction to which the pig is initially blown.

Subsequent to the roll of liner material being duly located either along the full length of the flexible pipe or along a predetermined length (for example for a short distance at the end regions of the flexible pipe close to ancillary equipment or where an inner bore is damaged) the securement securing the roll of liner material in a furled condition is broken and the liner material urged radially outwardly into an abutting relationship with an inner surface of the carcass or other undulating surface. As illustrated in FIG. 7 this can be achieved by driving a pipeline pig 70 in a direction P along the length of the flexible pipe body within the roll of liner material. An outer surface 71 of the pipeline pig has an outer diameter greater than an inner diameter I defined by an inner surface of the furled roll of liner material. Thus as the pig 70 is driven along the inner length of the roll of liner material the roll of liner material is caused to unfurl thus radially extending outwardly the liner material into an abutting relationship with the inner layer of the carcass. Prior to expansion it will be appreciated that the pig expands the roll of liner material to such an extent that the securement is broken to facilitate the unrolling of the roll of liner material.

It will be appreciated that certain embodiments of the present invention provide a convenient methodology by which monitoring equipment can be introduced along the length of a flexible pipe body. Monitoring equipment of this type is well known where bore conditions should be monitored continually or from time to time. For example, fibre optic cables or normal wires and/or sensors can be introduced by mounting them on a roll of liner material and then locating the liner in the bore of flexible pipe body.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A method of reducing fluid turbulence in a flexible pipe for transporting fluid from a subsea location, the method comprising the steps of:
   urging an elongate roll of liner material along a bore region provided by an inner surface of an innermost layer of a flexible pipe body, the innermost layer having a rough inner surface; and
   at least partially unfurling the roll of liner material thereby extending the roll of liner material radially outwardly in the bore region into an abutting relationship against the inner surface of the innermost layer.

2. The method as claimed in claim 1, further comprising the steps of:
   urging the roll of liner material along the bore region by pushing a rear end region of the roll of liner material through the bore region.

3. The method as claimed in claim 1, further comprising the steps of:
   urging the roll of liner material along the bore region by pulling a front end region of the roll of liner material through the bore region.

4. The method as claimed in claim 3, further comprising the steps of:
   urging a pig secured to the front end region of the roll of liner material through the bore region.

5. The method as claimed in claim 3, further comprising the steps of:
   urging a pig secured to at least one cord element through the bore region;
   securing an end region of the cord to a front end region of a roll of liner material; and
   pulling the cord along the bore region.

6. The method as claimed in claim 1, further comprising the steps of:
   subsequent to the roll of liner material being duly located along the bore region of the flexible pipe, releasing a securement securing an outermost edge region of the elongate roll of liner material with respect to an underlying region of the roll of liner material and allowing a natural tendency associated with the roll of liner material to unfurl a sheet of liner material.

7. The method as claimed in claim 1, further comprising the steps of:
   subsequent to the roll of liner material being duly located along the bore region of the flexible pipe, urging a pig along an inner bore of the roll of liner material, an outer diameter of the pig being greater than an inner diameter of the inner bore of the roll of liner material.

8. The method as claimed in claim 7, further comprising the steps of:
   simultaneously releasing a securement securing an outermost elongate edge region of the roll of liner material to an underlying region of the roll of liner material as the pig is urged along the inner bore of the roll of liner material.

9. The method as claimed in claim 1, further comprising the steps of:
   subsequent to the roll of liner material being duly located along the bore region of the flexible pipe, unfurling the roll of liner material radially outwardly until a profiled first elongate edge region of the liner material nests with a corresponding profiled remaining elongate edge region of a sheet of liner material.

10. The method as claimed in claim 9 wherein the profile of the first and remaining edge regions of the sheet of liner material are tapered or comprise mating notched shapes.

11. The method as claimed in claim 1, further comprising the steps of:
    prior to urging the roll of liner material along the bore region of the flexible pipe body, rolling an elongate, substantially rectangular, sheet of liner material into a roll to thereby provide the roll of liner material.

12. The method as claimed in claim 11, further comprising the steps of:
    securing an outermost edge region of the roll of liner material to an underlying region of the roll to thereby prevent the roll from unfurling.

13. The method as claimed in claim 1, further comprising the steps of:
    prior to urging the roll of liner material along the bore region of the flexible pipe body, unrolling a roll of bistable composite material, rolled along a first material axis, from a storage position; and
    allowing the unrolled composite material to roll up along a second material axis to thereby provide the roll of liner material.

14. The method as claimed in claim 1, further comprising the steps of:
    prior to urging the roll of liner material along the bore region of the flexible pipe body, extruding a cylindrical liner having a predetermined length, thickness and outer diameter;
    slitting the cylindrical liner along an elongate length in a straight or helical manner; and
    rolling the slit cylinder to thereby provide the roll of liner material.

15. A method of retrofitting a liner to a flexible pipe comprising the method as claimed in claim 1.

16. A method as claimed in claim 1 in which the innermost layer comprises a carcass.

17. Apparatus for reducing fluid turbulence in a flexible pipe for transporting fluid from a subsea location comprising:
    a carcass layer of a flexible pipe body having a rough inner surface;
    a barrier layer provided radially outside the carcass layer; and
    a layer of liner material having an outer diameter less than an inner diameter of the carcass layer of a flexible pipe body, the liner material located in an abutting relationship against the inner surface of the carcass layer.

18. The apparatus as claimed in claim 17, further comprising:
    at least one securement securing an outermost edge region of the roll of liner material to an underlying region of the liner material.

19. The apparatus as claimed in claim 18 wherein the securement comprises one or more welds or one or more strips of adhesive tape.

20. The apparatus as claimed in claim 17, further comprising:
    a first elongate edge region of the roll of liner material has a first cross sectional profile;
    a remaining elongate edge region of the roll of liner material has a further cross sectional profile; and
    the first and further cross sectional profiles enable the edge regions of the roll of liner material to nest together when the roll of liner material is unfurled into an abutting relationship with an inner surface of the carcass.

21. The apparatus as claimed in claim 20 wherein each of the first and further profiles is tapered or comprises a male and mating female cross section or comprises a mating stepped region.

* * * * *